United States Patent [19]
Horsch

[11] Patent Number: 5,238,341
[45] Date of Patent: Aug. 24, 1993

[54] CONNECTION SYSTEM FOR CONNECTING AN INTERCHANGEABLE TOOL HEAD TO A TOOL SPINDLE

[75] Inventor: Wilfried Horsch, Obrigheim, Fed. Rep. of Germany

[73] Assignee: GTE Valenite Corporation, Troy, Mich.

[21] Appl. No.: 511,828

[22] Filed: Apr. 16, 1990

Related U.S. Application Data

[63] Continuation of Ser. No. 312,413, Feb. 21, 1989, abandoned, which is a continuation of Ser. No. 808,976, Dec. 16, 1985, abandoned.

[51] Int. Cl.$^5$ ............................................. B23C 5/26
[52] U.S. Cl. ................................. 409/233; 279/900; 279/904; 408/239 R
[58] Field of Search ............... 409/231, 232, 233, 234; 408/56, 231, 232, 233, 239 R; 279/76, 900, 904, 2.02, 2.11, 32, 83, 85, 86, 97, 158, 159

[56] References Cited

FOREIGN PATENT DOCUMENTS

| | | |
|---|---|---|
| 3045536 | 7/1982 | Fed. Rep. of Germany . |
| 3406498 | 10/1984 | Fed. Rep. of Germany ...... 409/232 |
| 3416215 | 11/1985 | Fed. Rep. of Germany ...... 409/231 |
| 217460 | 1/1985 | German Democratic Rep. ..................................... 409/233 |
| 181533 | 10/1983 | Japan ................................. 409/231 |
| 914243 | 3/1982 | U.S.S.R. ............................... 408/56 |

OTHER PUBLICATIONS

"TZ fur Metallbearbeitung", Mar. 1984, No. 3/84, p. 26, (System Widia).

Primary Examiner—Z. R. Bilinsky
Attorney, Agent, or Firm—Bill C. Panagos

[57] ABSTRACT

A connection system for connecting an interchangeable tool head to the spindle of a numerically controlled machine includes radially displaceable wedge members which when actuated radially to an outer clamping position provide for a clamping connection between the spindle and the tool head. When actuated to an inner release position the system allows for withdrawal of the tool head from the spindle. The wedge members are displaced by a central actuating rod connected to the wedge members via cam means such that the wedge members are positively driven by the cam means in both radial directions of movement.

14 Claims, 4 Drawing Sheets

CONNECTION SYSTEM FOR CONNECTING AN INTERCHANGEABLE TOOL HEAD TO A TOOL SPINDLE

This is a continuation of copending application Ser. No. 07/312,413, filed on Feb. 21, 1989, abandoned, which is a continuation of copending application Ser. No. 06/808,976, filed on Dec. 16, 1985, abandoned.

FIELD OF THE INVENTION

The present invention relates to a connection system for a numerically controlled tool head and more particularly to a system for connecting an interchangeable tool head to a spindle of a numerically controlled machine.

BACKGROUND OF THE INVENTION

Connection systems used by industry in numerically controlled systems have generally relied on technology employing a projecting member concentric to a spindle axis shaped for secure connection with a matingly shaped bore. Locking mechanisms of the art such as radially directed wedge members have been actuatable by a number of methods including the use of threaded members having oppositely directed threads in engagement with bores of the wedge members. Radially oriented thru-bores are used in order to rotate the threaded member to radially displace the wedges. The threaded member may thereby be actuated by a manual or automatic tool member.

Displacing the wedge members from a location at the lateral sides of the tool head is sometimes disadvantageous. The clamping forces generated are limited by the threaded connection between the threaded member and the wedge members.

In addition, providing a cooling system such as by feeding cooling fluid through the threaded member to the tooling has not typically been possible.

In German publication entitled "tz fur Metallbearbeitun", 1984, No. 3/84, page 26 (system WIDIA), a general discussion of a connection system is presented. Clamping pins positioned in inclined bores engage recesses in a tool head when actuated in an outward radial direction. The tool head is drawn against the spindle when the clamping pins are actuated radially outward and released when drawn inward. Displacement of the pins is provided by a central actuating rod which engages the pins via a conical head portion. The clamping pins are moved radially inward by correspondingly shaped recesses of the tool head for tool changing. The use of clamping pins however both limits the clamping forces and necessitates the use of substantial forces to separate the tool head from the spindle when the pins become stuck due to chips or the like.

It is therefore an object of the present invention to provide a connection system for connecting an interchangeable tool head to a spindle of a numerically controlled machine by central actuating means capable of generating high clamping force and quick release.

SUMMARY OF THE INVENTION

Accordingly, the present invention provides a connection system for connecting an interchangeable tool head to a spindle of a numerically controlled machine comprising a projection concentric to the spindle axis and projecting into a matingly shaped bore. Also included is a plurality of wedge members supported in the projection for movements in radial directions with respect to the spindle axis, and actuating means for displacing the wedge members between a clamping position and a release position. The wedge members, when actuated, have inclined surfaces which engage correspondingly inclined recesses in the boring wall which draw a first annular face adjacent to the projection against a second annular face adjacent to the bore. The actuating wedge members are removed from the recesses in the boring wall by the radially inward movement of the wedges thereby allowing for withdrawal of the projection from the bore. The displacing means further comprises a cam connecting the wedge members to a reciprocating actuating rod concentric to the spindle axis, and cam projections associated to the actuating rod and positively driven by means of matingly shaped cam grooves of the actuating rod. The wedge members may thereby be displaced in opposite radial directions.

One advantage of the connection system of the present invention is that the wedge members are positively driven in both radial directions by cam means providing a positive clamping force and release mechanism. Secure clamping and tool head withdrawal from the spindle is thereby facilitated in a particularly simple and easy manner.

Another advantage of the present invention resides in the fact that it may be used as a connector with standard tool heads, conventional tool handling system, as well as with conventional magazines. Conventional spindles may also be used if the connection system of the present invention is provided between a separate flange member fixed to the spindle and the tool head.

A further advantage of the connection system of the present invention is that it allows for a cooling fluid feed system which feeds cooling fluid by means of a central bore.

Finally, the present invention provides for structural simplicity, high functional reliability and ease of handling.

BRIEF DESCRIPTION OF THE DRAWINGS

Embodiments of the present invention will be explained with reference to the accompanying drawings, in which.

DETAILED DESCRIPTION A PREFERRED EMBODIMENT

Figure 1:
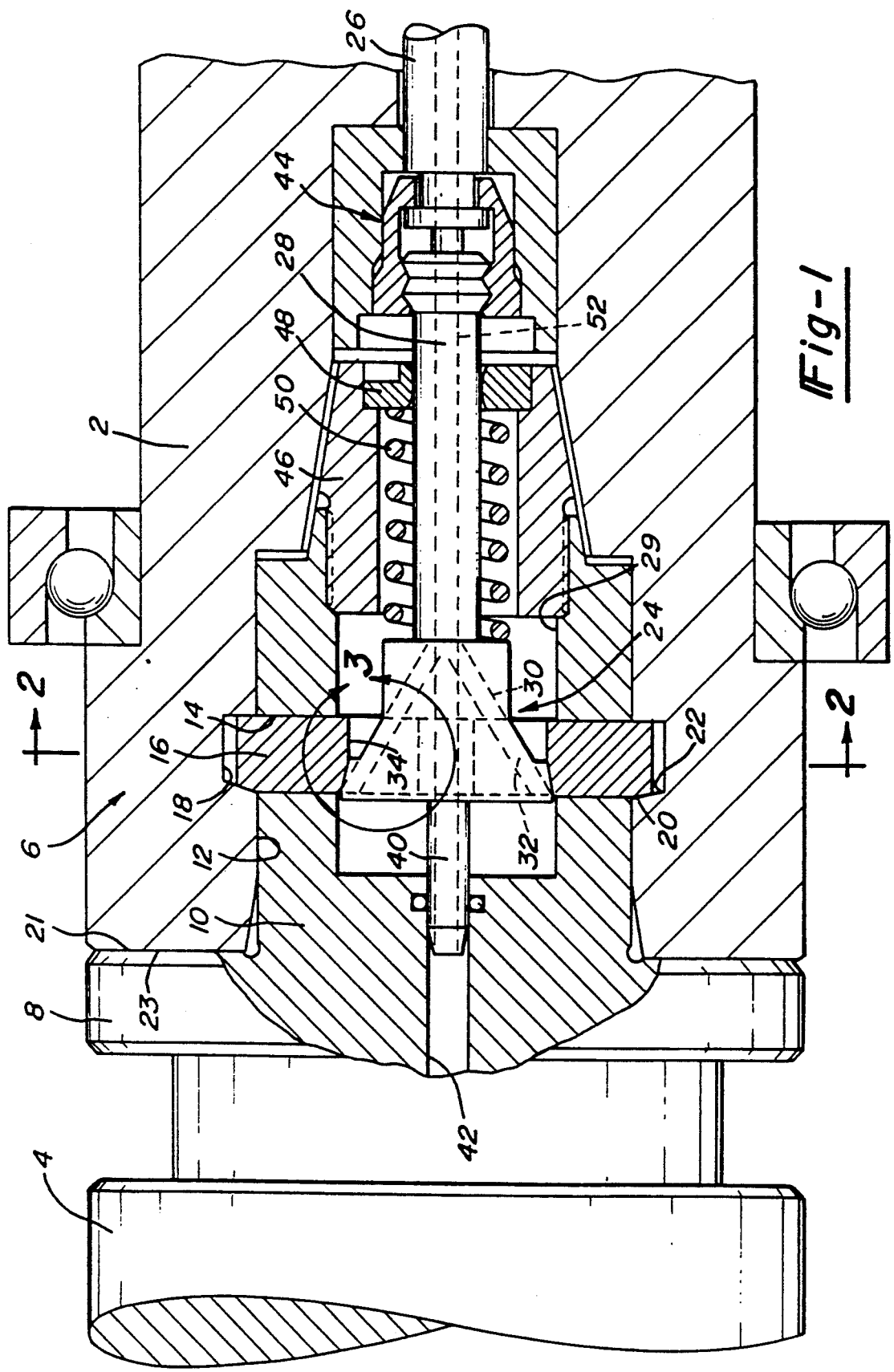
FIG. 1 is a longitudinal section of a connection system for connecting a tool head to a tool spindle according to the present invention.

As shown in FIG. 1, a tool head 4 is removably mounted to a rotatable spindle 2 of a numerically controlled (NC) machine (not shown) by means of a connection system 6. Although tool head 4 is depicted as a boring bar, it should be recognized by those skilled in the art that the tool head could be substituted by any rotating tool.

Connection system 6 includes a flange 8 mounted to the rear end of tool head 4 and extending therefrom is a cylindrical projection 10 concentric to the spindle axis.

Projection 10 is fitted into a matingly shaped bore 12 of the spindle 2.

In a radial thru-hole 14 of projection 10 a pair of diametrically opposed wedge members 16 are disposed for radial sliding movement. While the present embodiment provides two wedge members, it is to be recognized that three or more wedge members may be provided.

Wedge members 16 each are displaceable between a radially outer clamping position and a radially inner release position. In FIG. 1 the wedge members 16 are actuated to their clamping positions with their radially outer ends extending into recesses 18 in the wall of bore 12. Wedge members 16 have inclined surfaces 20 which, when actuated are urged against inclined surfaces 22 in recesses 18 such that clamping forces applied to projection 10 tend to draw projection 10 into bore 12. Face 21 of flange 8 and face 23 of spindle 2 face opposite to each other and lie in radial planes. When actuated, the faces are thereby urged against each other.

For radially displacing wedge members 16 there are provided cam means 24 which are actuated by a centrally disposed actuating rod 26 which is reciprocable by a drive (not shown).

Figure 2:
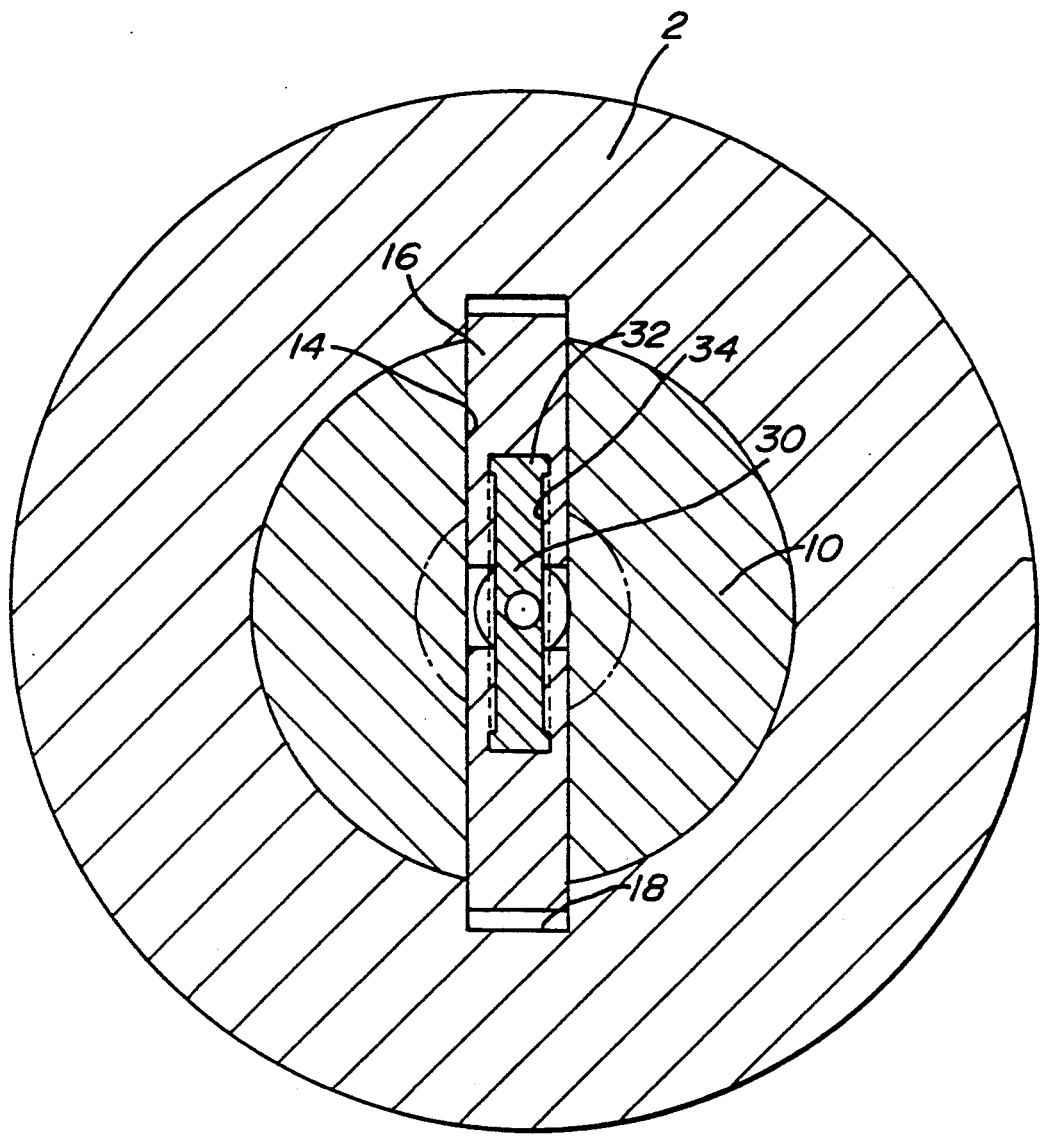
FIG. 2 is a cross-section along line II—II in FIG. 1.

Cam means 26 include an anchor member 28 coaxial to actuating rod 26 and an integral cam member 30. Cam member 30 is disposed at the radially inner side of wedge members 16 in a recess 29 of projection 10 (see also FIG. 2) and is provided at opposite sides with a pair of cam projections 32 inclined to the spindle axis and guided in cam grooves 34 of wedge members 16. As shown in FIG. 2, cam projections 32 and cam groove 34 have substantially T-shaped cross-section so that wedge members 16 may be displaced by cam member 30 in opposite directions of movement.

Figure 3:
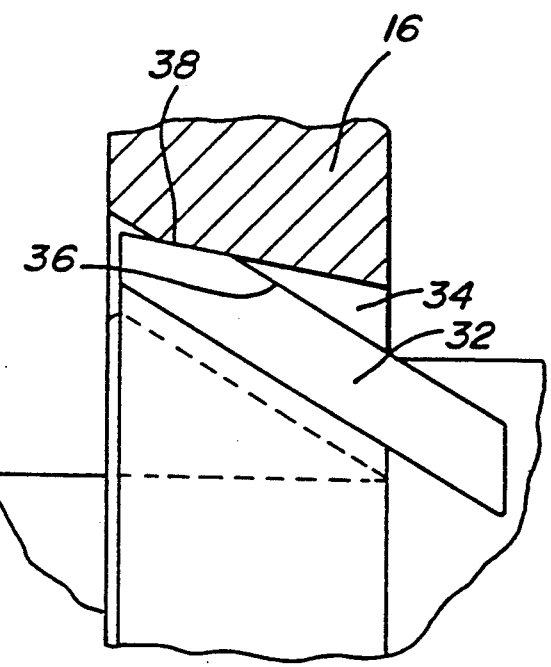
FIG. 3 is an enlarged view of a detail shown in FIG. 1.

As shown in FIG. 3, cam projections 32 and cam grooves 34 each have a section 36 of relatively steep inclination and a section 38 of relatively lesser inclination by comparison. The steeper inclination 36 provides for a rapid radial stroke of wedge members 16, while the portions of more gradual inclination 38 are used to generate the correspondingly high clamping forces.

A cylindrical guide member 40 (FIG. 1) is provided at the end of cam member 30, facing tool head 4, and is guided in a central cooling fluid bore 42 of tool head 4. Anchor member 28 provided at the other end of the cam member 30 is connected to actuating rod 26 by means of an automatically actuatable coupling 44. Since the structure of coupling 44 may be conventional, it will not be explained in detail. It should be sufficient to note that coupling 44 is automatically released by a displacement of actuating rod 26 to the left (in FIG. 1) so that anchor member 28 is separated from actuating rod 26. Coupling 44 is automatically engaged by a return movement of actuating rod 26 to the right (in FIG. 1) in order to connect anchor member 28 to actuating rod 26.

A sleeve member 46 is threadingly engaged in the free end of projection 10 and includes an annular abutment member 48 fixed to the free end of sleeve member 46. Abutment member 48 serves to support a helical compression spring 50 which biases cam member 30 and wedge members 16 to their release positions.

A cooling fluid passage 52 extends through actuating rod 26, anchor member 28, cam member 30, guide member 40 and opens into cooling fluid bore 42 of tool head 4 so that the tooling (not shown) may be supplied with a cooling fluid in a simple and effective manner.

Operation of the described connection system is as follows:

Actuating rod 26 when in the clamping position shown in FIG. 1 is urged to the right, e.g. by a plurality of Belleville springs (not shown). The axial forces applied to actuating rod 26 are transferred to cam member 30 via coupling 24 and anchor member 28. Cam member 30 transfers these forces by means of cam projections 32 and cam grooves 34 to wedge members 16. As a result wedge members 16 have their inclined surfaces 20 urged against inclined surfaces 22 of recesses 18 to thereby draw faces 21 of tool head 4 and 23 of spindle 2 against each other.

Since projection 10 is of cylindrical shape, substantial pressure surfaces at the area of faces 21, 23 are available allowing tool head 4 to be of substantial length. Alternatively, projection 10 could be tapered for receipt in a conventional conical spindle recess.

For initiating a change of tool head 4, actuating rod 26 performs a work stroke to the left (in FIG. 1) under the control of e.g. a hydraulic motor (not shown). As a result, anchor member 28 and cam member 30 are displaced to the left a corresponding distance whereby wedge members 16 are drawn radially inwards by cam means 24 until they have completely cleared recesses 18 of projection 10. Simultaneously, coupling 44 is disengaged so that anchor member 28 is disconnected from actuating rod 26.

Tool head 4 including cam means 24, anchor member 28, sleeve member 46, abutment member 48, and spring 50, now may be easily withdrawn from spindle 2. Tool head 4 may be moved to a tool magazine by means of a conventional handling system to be exchanged for another tool head 4.

During this handling, spring 50 biases cam member 30 and thereby wedge members 16 to their release positions so that wedge members 16 will not become lost.

When projection 10 of a new tool head 4 has been inserted into bore 12, actuating rod 16 is moved to the right (in FIG. 1) to engage coupling 44 and displace wedge members 16 radially outwardly. Due to the differential inclination of sections 36, 38 of cam projections 32 and cam grooves 34 (FIG. 3), the radially outward movement of wedge members 16 initially is relatively rapid and thereafter relatively slow, with relatively high clamping forces being generated during such relatively slow movement. Connection system 6 now is in its clamping position to securely connect tool head 4 to spindle 2.

Figure 4:
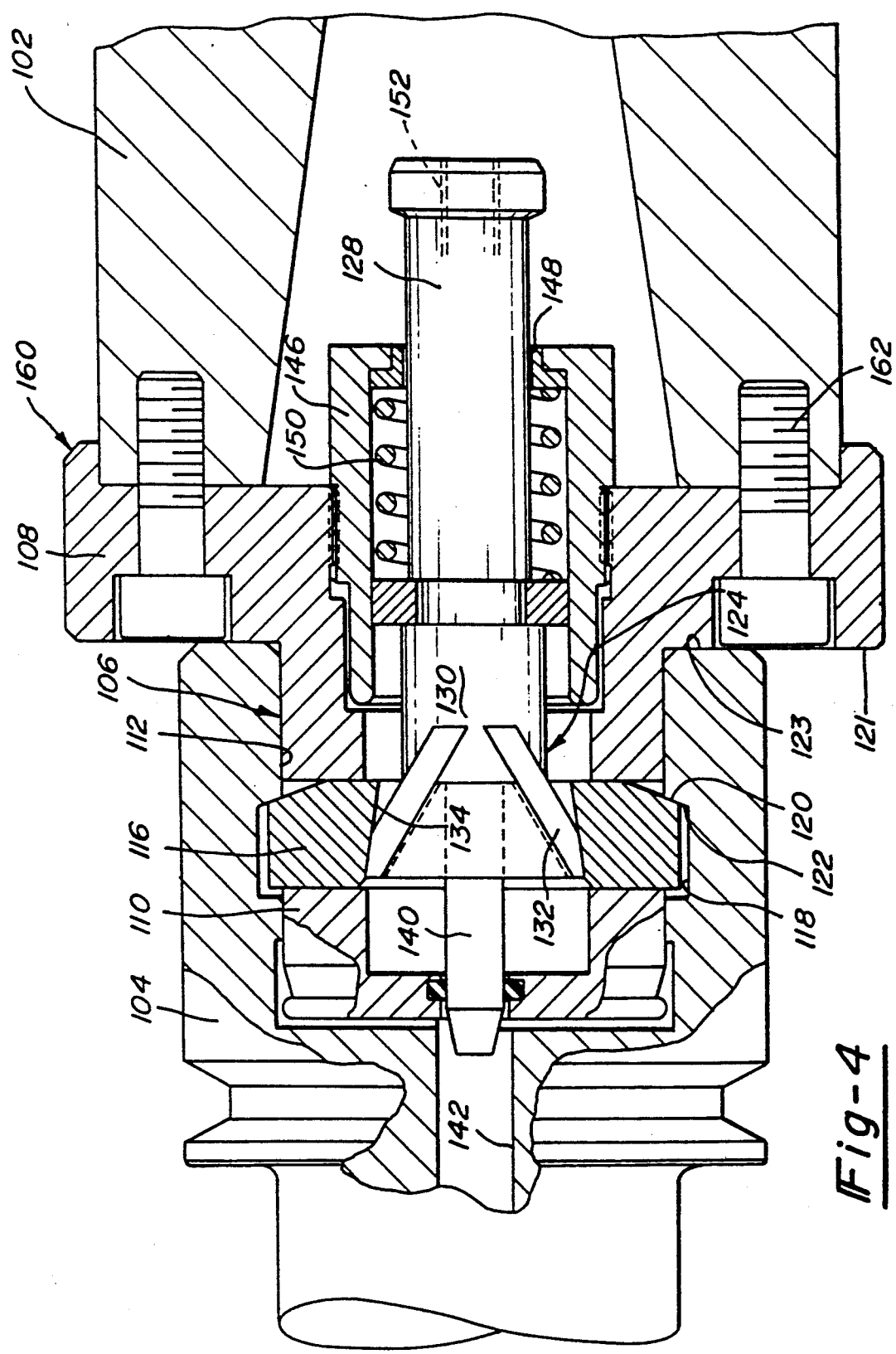
FIG. 4 is a longitudinal section of another embodiment of the present invention.

A modification of the connection system of FIG. 1 is shown in FIG. 4. In FIG. 4 components corresponding to those in FIG. 1 have been designated with the same reference numeral plus 100.

As shown in FIG. 4, the basic structure of connection system 106 including cam means 124 and anchor member 128 is substantially the same as with the embodiment of FIG. 1. A substantial difference of the embodiment of FIG. 4 as compared to that of FIG. 1 resides in the fact that in FIG. 4 projection 110 is not provided at the tool head but rather at a separate flange member 160 which is fixed to spindle 102 by means of bolts 162. Bore 112 receiving projection 110 is provided at tool head 104.

One advantage of the embodiment illustrated in FIG. 4 is that spindle 102 does not have to be modified and adapted to the connect-ion system of the present invention, but rather it may be provided with a conventional conical recess 164 as shown.

A further advantage of the embodiment of FIG. 4 is that flange member 160 including cam means 124, anchor member 128, and the other associated components remain in spindle 102 when tool head 104 is withdrawn. As illustrated, an automatically releasable couple between anchor member 128 and the actuating rod is not necessary. Furthermore, spring 150 may be dispensed with since wedge members 116 may be held in their radially inner release positions by the drive (not shown) for the actuating rod when tool head 104 has been withdrawn. In all other aspects, the method of operation is the same as in the embodiment of FIG. 1.

Figure 5:
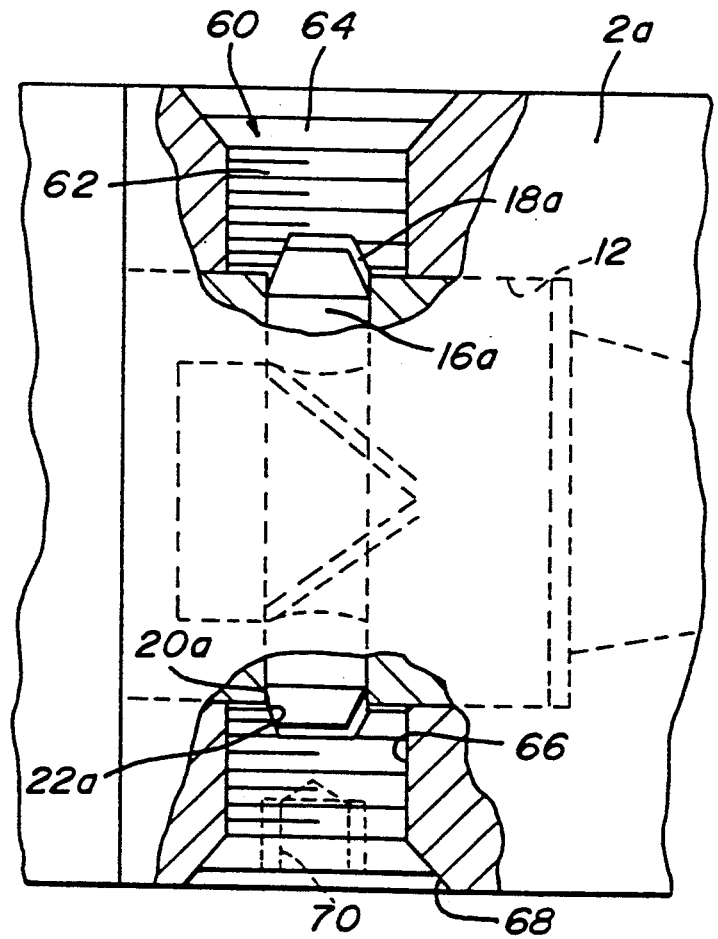
FIG. 5 is a longitudinal section of a further embodiment of the present invention.

With the embodiment shown in FIG. 5 recesses 18a in the bore wall are provided in wear members 60, which are removably mounted in the bore wall. Each wear member 60 comprises a threaded shaft portion 62 and a head portion 64. Shaft portion 62 is threadedly engaged in a radially extending threaded bore 66 of the bore wall, while the tapered head portion 64 engages a matingly tapered abutment surface 68 adjacent to threaded bore 66.

Each wear member 60 is provided with a wrench receiving recess 70 having access from the outside. This allows for wear members 60 to be threadingly moved into threaded bores 66 until the head portions 64 engage tapered abutment surfaces 68. As a result wear members 60 are radially and axially fixed with respect to bore 12a.

The wear members at their ends facing the interior of bore 12a are provided with recess 18a having a tapered surface 22a, which is of conical shape in the present embodiment. Tapered surfaces 20a of wedge members 16a are also of conical shape.

The use of separate wear members allows to replace the wear members when tapered surfaces 22a have become worn.

Since variation of this invention will be apparent to those skilled in the art, it is intended that this invention be limited only by the scope of the appended claims.

What is claimed is:

1. A connection system for connecting an interchangeable tool head to a spindle of a numerically controlled, machine, comprising:
   a spindle rotatable about a central axis having a first face,
   a projection member oriented concentrically to said axis, said projection member having a flange extending normal to said axis,
   said flange having a second face,
   said spindle board for receipt of said projection,
   said projection having a plurality of wedge members supported therein for movement in radial directions with respect to said axis,
   said bore having a plurality of recessed pockets with inclined surfaces positioned for receipt of said wedge members,
   actuating means concentric with said axis and having camming members disposed thereon,
   said camming members including cam projections,
   said wedge members having inclined surfaces which engage said cam projections for translating reciprocating movement of said actuating means into radial movement of said wedge means,
   said wedge members having inclined surfaces which engage said inclined recesses in said bore to drive said first spindle face against said second face for clamping engagement, and
   said wedge members having inclined surfaces which engage said inclined recesses in said bore to drive said first spindle face from said second face for withdrawal of said projection from said bore for a tool change.

2. The connection system according to claim 1, wherein said cam grooves and cam projections are of T-shaped cross section.

3. The connection system according to claim 2, wherein said cam grooves and cam projections each comprise a first section of relatively steep inclination to allow for rapid radial advance and a second section of relatively less inclination for generating the clamping forces.

4. The connection system according to claim 3, wherein said cam projections are provided on a cam member integral with an anchor member connected to the actuating rod.

5. The connection system according to claim 4, wherein said anchor member is provided with a central projecting guide member sealingly and slidingly received in a cooling fluid bore formed in the bottom wall of said bore thereby providing said anchor member and its guide member with a continuous cooling fluid bore.

6. The connection system according to claim 5, wherein said projection and wedge members are provided on the tool head and said bore is provided in the spindle, said anchor member which is disposed in the tool head is connected to the actuating rod by an automatically releasable coupling such that when charging the tool head the wedge members, the cam members and the anchor member are withdrawn from the bore together with said projection.

7. The connection system according to claim 6, wherein said wedge members are biased into their release positions by resilient means for engaging said anchor member.

8. The connection system according to claim 7 wherein said recesses of the bore wall are provided in replaceable wear members which are radially and axially fixed on the bore wall.

9. The connection system according to claim 8, wherein each of said wear members comprises a threaded shaft adapted for threadingly engagement of the bore wall, and a head portion in abutting engagement with an abutment surface of the bore wall.

10. The connection system according to claim 9, wherein the inclined surfaces of said wedge members and recesses are comprised of conical surfaces.

11. A connection system for connecting an interchangeable tool head to a spindle of a numerically controlled machine, comprising:
   a spindle rotatable about a central axis having a first face,
   a projection member oriented concentrically to said axis, said projection member having a flange extending normal to said axis,
   said flange having a second face,
   said spindle bored for receipt of said projection,
   said projection having a plurality of wedge members supported therein for movement in radial directions with respect to said axis,
   said bore having a plurality of recesses pockets with inclined surfaces positioned for receipt of said wedge members,
   actuating means concentric with said axis and having camming grooves disposed thereon, said wedge members having camming projections which engage said camming grooves for translating reciprocating movement of said actuating means into radial movement of said wedge means, said wedge members having inclined surfaces which engage said inclined recesses in said bore to drive said first spindle face from said second face for clamping engagement, and said wedge members having inclined surfaces which engage said inclined recesses in said bore to drive said first spindle face from said second face for withdrawal of said projection from said bore for a tool change.

12. The connection system according to claim 11, wherein said recesses of the bore wall are provided in replaceable wear members which are radially and axially fixed on the bore wall.

13. The connection system according to claim 12, wherein each of said wear members comprises a threaded shaft adapted for threadingly engagement of the bore wall and a head portion in abutting engagement with an abutment surface of the bore wall.

14. The connection system according to claim 13, wherein the inclined surfaces of said wedge members and recesses are comprised of conical surfaces.

* * * * *